(12) United States Patent
Cotterill

(10) Patent No.: US 7,765,491 B1
(45) Date of Patent: Jul. 27, 2010

(54) USER INTERFACE WIDGET FOR SELECTING A POINT OR RANGE

(75) Inventor: Stephen Cotterill, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 11/282,069

(22) Filed: Nov. 16, 2005

(51) Int. Cl.
*G06F 3/048* (2006.01)
*G06F 3/00* (2006.01)
*G09G 5/00* (2006.01)
*G06F 3/033* (2006.01)

(52) U.S. Cl. ............. 715/833; 715/720; 715/721; 715/781; 715/786; 715/787; 345/156; 345/157

(58) Field of Classification Search ......... 715/786, 715/833

See application file for complete search history.

(56) References Cited

U.S. PATENT DOCUMENTS

| | | | |
|---|---|---|---|
| 5,675,358 A | 10/1997 | Bullock et al. | |
| 5,752,244 A | 5/1998 | Rose et al. | |
| 6,252,594 B1 * | 6/2001 | Xia et al. | 715/786 |
| 6,253,218 B1 | 6/2001 | Aoki et al. | |
| 6,486,896 B1 * | 11/2002 | Ubillos | 715/784 |
| 2001/0004268 A1 | 6/2001 | Kubo et al. | |
| 2002/0010589 A1 | 1/2002 | Nashida et al. | |
| 2002/0057287 A1 * | 5/2002 | Crow et al. | 345/716 |
| 2002/0180803 A1 | 12/2002 | Kaplan et al. | |
| 2003/0084065 A1 | 5/2003 | Lin et al. | |
| 2003/0093445 A1 | 5/2003 | Schick et al. | |
| 2003/0123713 A1 | 7/2003 | Geng | |
| 2003/0174173 A1 * | 9/2003 | Nishiyama et al. | 345/786 |
| 2003/0190090 A1 | 10/2003 | Beeman et al. | |
| 2003/0227468 A1 | 12/2003 | Takeda | |
| 2004/0024758 A1 | 2/2004 | Iwasaki | |
| 2004/0133927 A1 | 7/2004 | Sternberg et al. | |
| 2004/0139400 A1 | 7/2004 | Allam et al. | |
| 2004/0189827 A1 | 9/2004 | Kim et al. | |
| 2005/0010475 A1 | 1/2005 | Perkowski et al. | |
| 2005/0192924 A1 | 9/2005 | Drucker et al. | |
| 2006/0041613 A1 | 2/2006 | Fackelmayer et al. | |
| 2006/0071942 A1 | 4/2006 | Ubillos et al. | |
| 2006/0071947 A1 | 4/2006 | Ubillos et al. | |
| 2006/0119619 A1 | 6/2006 | Fagans et al. | |
| 2007/0174774 A1 * | 7/2007 | Lerman et al. | 715/723 |

OTHER PUBLICATIONS

Merriam-Webster Collegiate Dictionary, 1999, Tenth Edition, 3 pages.*

* cited by examiner

*Primary Examiner*—Kieu Vu
*Assistant Examiner*—Yongjia Pan
(74) *Attorney, Agent, or Firm*—Hickman Palermo Truong & Becker LLP; Adam C. Stone

(57) ABSTRACT

A technique for selecting and/or displaying an exact point or a range is provided wherein a slider widget comprising a thumb with a left edge and a right edge lying in proximity to the left and right edges of the thumb is provided such that a user may utilize the widget to display an exact point or a range.

34 Claims, 9 Drawing Sheets

USER INTERFACE WIDGET FOR SELECTING A POINT OR RANGE

FIELD OF THE INVENTION

The present invention relates to user interface elements, and more specifically, to a user interface technique for selecting a point or range.

BACKGROUND

One of the primary benefits of a Graphical User Interface (GUI) is the use of visual tools, or widgets, to select items such as applications, documents, folders and the like, as well as discrete points within such items. One such widget commonly used today is a "slider." As shown in FIG. 1, a slider 102 usually consists of two parts: a finite "track," 104 which is usually a horizontal or vertical area defining the full range of potential selections to which the track refers. The other part of a slider is the "thumb," 106 which may take on different forms, but its main purpose is to select a single point on the finite track 104. A slider 102 allows a user to position the thumb 106 at any point along the track 104 such as to represent a relative point or amount in an application or file.

By using a slider as a GUI widget, certain actions may be taken. In one case, a video file may use a slider to allow the user to select a specific point in the video. In this case, the track would represent the entire running time of the video, and the thumb would be placed on the track in the approximate position where the desired selection lies. For example, the video may be ten minutes long. Usually, the length of the track does not change based on the length of the video, but the scale of the track changes. This means that a point one-tenth of the way from the beginning of the track of a ten-minute video represents the point existing at the one-minute section of the video.

The same video, this time ten hours long, will have the same length as the track for the ten-minute video, but a point one-tenth of the way from the beginning of the track of a ten-hour video represents the point existing at the one-hour section of the video. Therefore, the same unique point of a ten-minute track and a ten-hour track lie on the same point of the track, but represent different measures of time depending on the actual length of the video to which the slider is attached. In many cases, resizing the window containing the slider widget and the file to which it refers will change the physical size of the track, but the relative positions as described above remain the same. A drawback to the above approach is the lack of capability to select a range within the file or other element to which the slider refers. For example, the above approach does not provide a way to select a one-minute long portion of the entire video.

There exist techniques which use a slider widget to both select a point on a track and select a range on the same track. One such technique is illustrated in FIG. 2. The slider 202 in this example is used with a video file, although it may be applied to other types of files. One way this slider may be used is to select a point in the video, as above described. The track 206 again represents the entire running time of the video. The thumb 208 again represents a single point on the finite track 206. In this example, the placement of the thumb 208 represents the six-second mark of the video.

FIG. 2 also illustrates the same slider widget 204 used to select a point in the video and a finite range within the entire video. The thumb 210 again represents a single point on the finite track 212. In this example, however, there exist elements to select a range within the track 212. The range boundary indicators 214 serve to define a specific range of time within the entire video. In this example, the placement of the thumb 210 represents the forty-three second mark of the video, and the thumb lies within the section of the video defined by the range boundary indicators 214.

A drawback to the above approach is lack of the capability to slide the entire range as defined by the range boundary indicators 214. If a user decides to change the range of the selection, for example to increase or decrease the selected range or simply move the same "length" of the range to a different portion of the video, each range boundary indicator 214 must be moved separately. This is an inefficient use of a GUI widget, as a purpose of the widget is to reduce the amount of work required to accomplish the given task. Another drawback is that the thumb 210 must be moved in order to set the range. It is often not possible to select a range that does not include the thumb 210. Therefore, either the range is selected around the current thumb position or the thumb is moved to a point within the to-be-selected range. Again, this is an inefficient use of a GUI widget and only serves to increase the amount of work for a user.

While the prior approaches may occasionally serve the limited purpose of selecting a single point or a range, there exists a need for a technique that allows the selection of a point or range that does not suffer from the above-described shortcomings.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
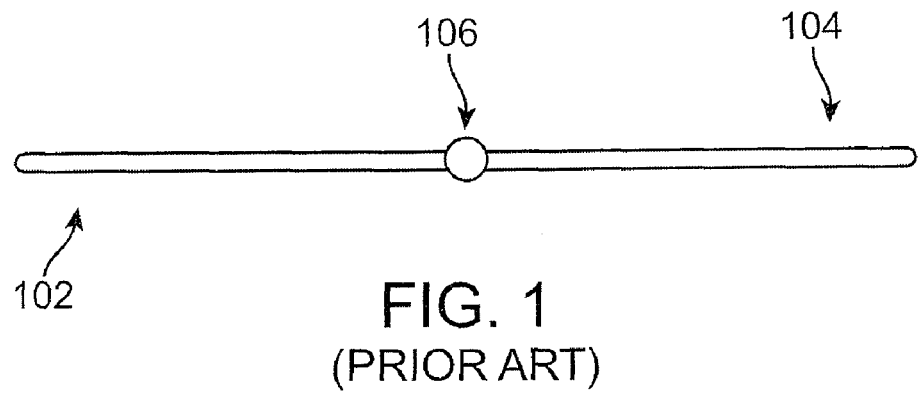
FIG. 1 is a block diagram illustrating one example of a slider.
Figure 2:
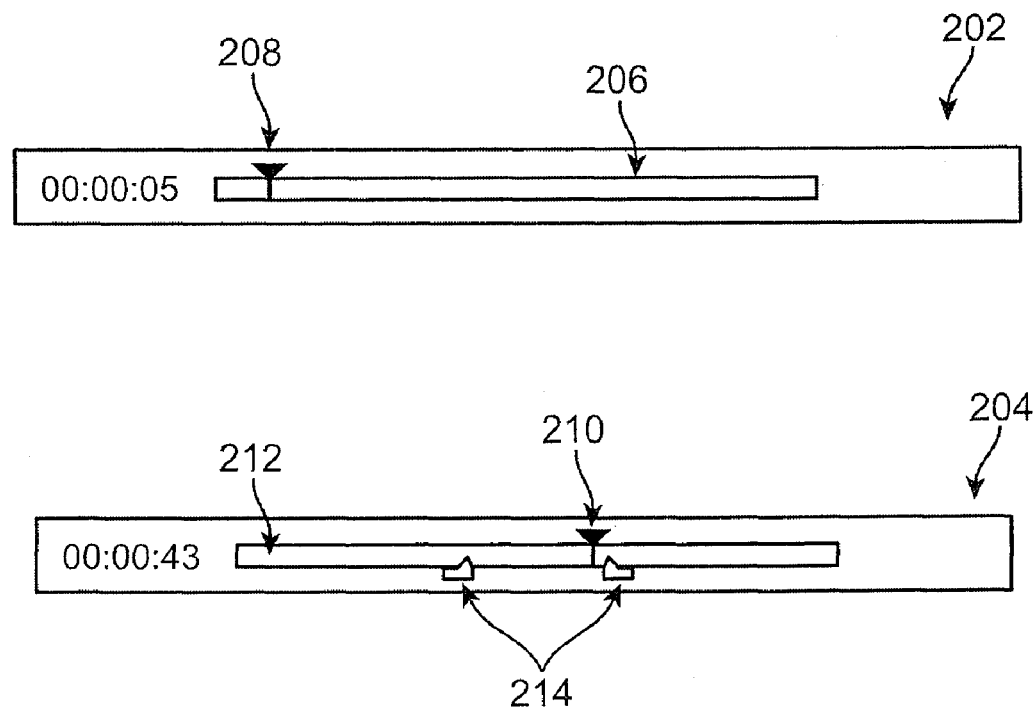
FIG. 2 is a block diagram illustrating one example of a slider.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Overview

According to techniques described herein, a slider widget is provided such that a user may utilize the widget to display an exact point or a range. While previous slider widgets have allowed a user to position the thumb, or control, at any point along a track such as to represent a relative point or amount in an application, file, or the like, the techniques described herein provide additional capability of, among other things, allowing a user to define a selected range on the track as well as a point.

The slider widget serves as a simple way to specify and/or move either (1) an exact point or (2) an entire range and a point within the range. The slider widget is compact, taking up a minimal amount of valuable screen space and having the capabilities of multiple types of sliders contained within one GUI element. The slider widget allows selection of a range without changing the current selection point represented by a thumb. The thumb operates as a "selection point." By combining the position and selection tools, the slider widget saves the user time (in mouse movement) and provides additional capabilities not currently available, such as maintaining a constant frame of focus regardless of position.

By combining the position and range selection tools, the slider widget described herein saves a user time (in mouse movement, for example) and provides additional capabilities, with one such capability being maintaining a constant frame of focus regardless of position. Other benefits and capabilities are envisioned.

According to one embodiment, the slider widget described herein comprises a thumb, a left edge and a right edge. The left and right edges are initially located in proximity to the left and right sides of the thumb, respectively. The left edge defines a range start point and the right edge defines a range end point. In one embodiment, the thumb is always at the center of the range defined by the left and right edges. When the left and right edges are immediately adjacent to the thumb, the slider acts as a point selection tool that defines a point within the entire range of the track.

According to one embodiment, the slider widget supports a "fixed thumb" mode of operation and a "fixed edge" mode of operation. In the fixed edge mode of operation, one edge (the "fixed edge") remains at the thumb location while the other edge is moved away from the thumb. When the moved edge is released, the fixed edge remains in place while the thumb automatically moves to center of the range defined by the fixed edge and the moved edge. Thus, the fixed edge mode allows a user to define a range from the initial thumb location.

In fixed thumb mode, moving one edge away from the thumb automatically causes the other edge to move away from the thumb, thereby keeping the thumb in the center of the range defined by the edges. Thus, the fixed thumb node allows users to define a range "around" the thumb. Modifier inputs may be used to choose between modes.

According to one embodiment, the slider begins as a point selector along a track. A user may click on the thumb of the slider and drag the thumb to another position on the track to select a point. In fixed edge mode, an edge that is not moved remains fixed at that point. In fixed thumb mode, the edge that is not moved by the user is automatically moved away form the thumb, which remains fixed. In either mode, a range selection is defined upon the release of the moved edge, where the endpoints of the range correspond to the location of the two edges.

A user may then select another, separate range of equal size along the track by clicking on the thumb of the slider and dragging the thumb to another position on the track. While the thumb is moved, the left and right edges also move such that their distance from the thumb does not change. Upon releasing the thumb, the new range is set by the new positions of the edges. According to one embodiment, to quickly return to selecting a discrete point, a user may click on the thumb of the slider and release without dragging. The edges will then contract to a position adjacent to the thumb indicating the change in operation. Other embodiments envision the use of visual aids such as tooltips to assist a user in accurately positioning the slider.

GUI Widget Enabling Selection of a Point or Range

Figure 3:
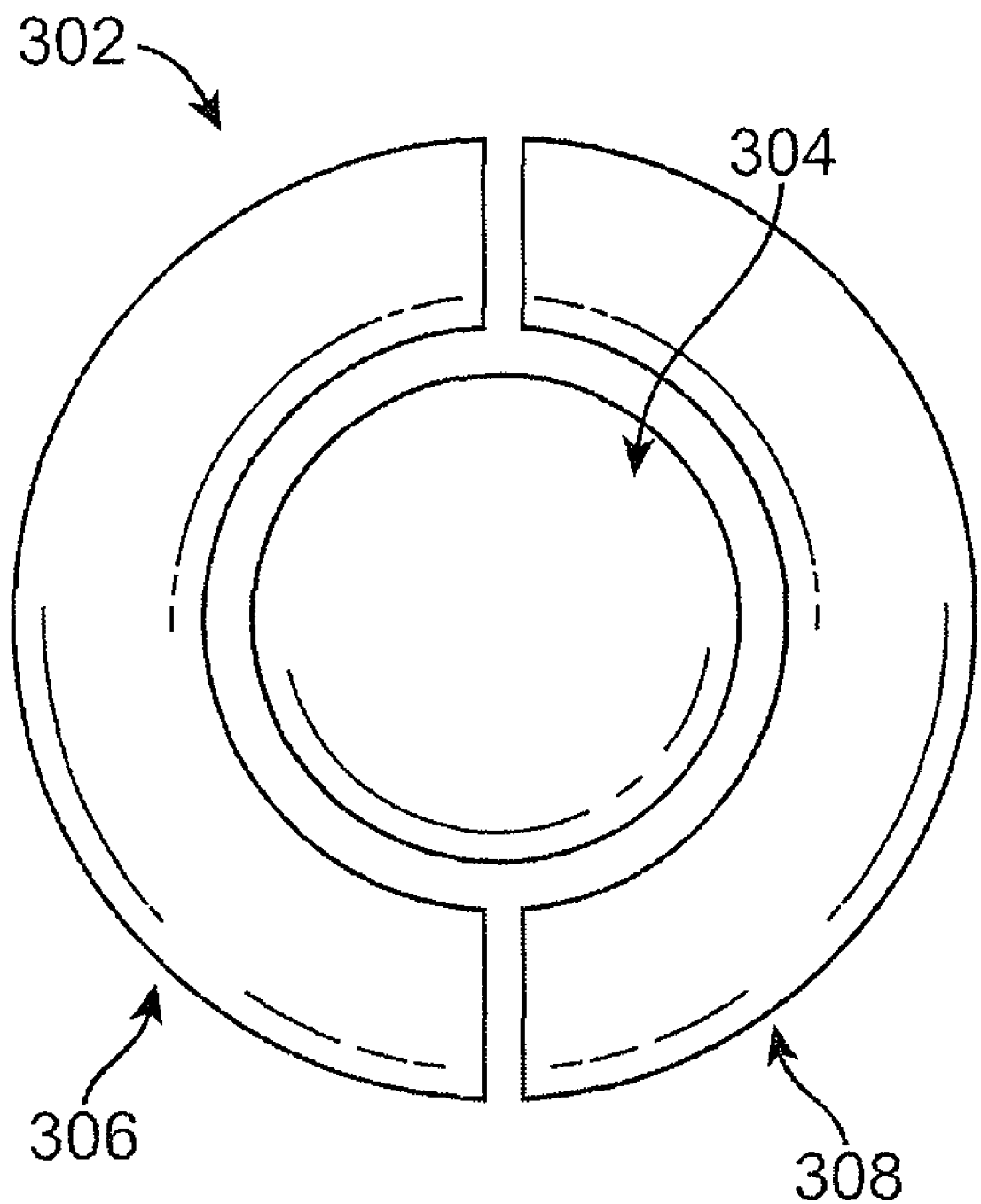
FIG. 3 is a block diagram illustrating an embodiment of the invention.

FIG. 3 illustrates an embodiment of the invention. The slider 302 illustrated therein consists of a central thumb 304 and two edges 306, 308. The thumb 304 sets the position of the thumb 304, or control, along the track and the edges 306, 308 define the endpoints of a selected range. According to one embodiment, the edges 306, 308 stay attached to either side of the thumb 304 when the thumb is used to define a point.

Selecting a Range Using Fixed Edge Mode

Figure 4:
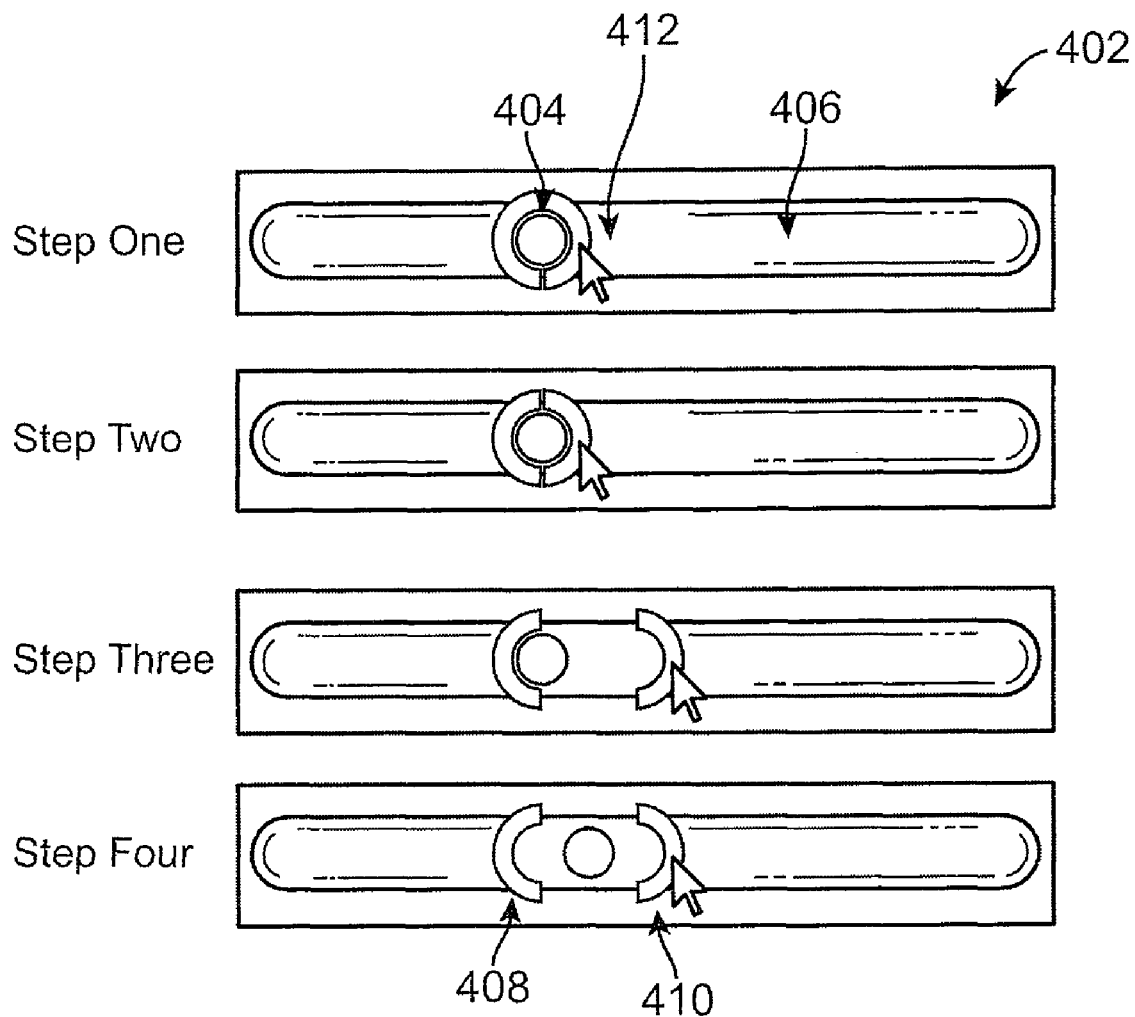
FIG. 4 is a block diagram illustrating an embodiment of the invention.

FIG. 4 illustrates an embodiment of the invention wherein the slider 402 is used in fixed edge mode to define a range "from" a selection point. To begin, the thumb 404 is positioned at a discrete location on the track 406, serving to define a point. This is shown by the edges 408, 410 staying attached to either side of the thumb 404, according to one embodiment.

According to one embodiment, a user desiring to define a range from the thumb may accomplish this task through the following steps. In step one, the user positions a pointer 412, manipulated by a mouse or similar input device, over either edge of the control. In the illustrated embodiment, the pointer 412 is positioned over the right edge 410 of the control. In step two, the user selects the right edge 410 of the control by clicking a mouse button or providing similar input. According to one embodiment, visual or other feedback may be given upon clicking on the right edge 410, such as changing the appearance of the right edge 410. Clicking the right edge 410 of the control operates to ready the right edge 410 for repositioning and ultimately defining a selected range.

In step three, the user drags the right edge 410 along the track 406 to the right in order to define the right endpoint of the selected range. The left endpoint is defined by the initial position of the thumb 404. According to one embodiment, visual or other feedback may be given while dragging to indicate that a range is being defined, such as highlighting the range or edge. In step four, the user releases the mouse button or similar input control, which operates to "set" the rightmost point of the range. According to one embodiment, visual or other feedback may be given upon releasing the right edge 410, such as blinking the range. Upon release of the right edge, the left edge 408 stays fixed and the thumb 404 moves to a point that is at equal distance between the left edge 408 and the right edge 410. This operates to create an equidistant range around the thumb 404. Alternatively, the thumb 404 moves away from the left edge 408 while the right edge is being moves, to continuously maintain the thumb 404 at the center of the selected range.

In the example described above, the right edge 410 was moved and the left edge was the fixed edge. Similarly, if the user performs the above steps to move the left edge 408, the right edge 410 remains fixed.

Repositioning a Range while Maintaining the Size of the Range

According to a preferred embodiment, the thumb 404 remains at the midpoint of any selected range. This demonstrates to the user that the thumb 404 is the "handle" of the selection, rather than an independent marker along either the track or selected range. Therefore, upon defining a range as described above, the user clicks on the thumb 404 and by moving the thumb 404 to the right or left on the track, thereby allowing a defined selected range to be repositioned to represent the same size selection or amount at different points on the track. For example, a user could use the above technique to select a range representing one minute on a video playback timeline and reposition it to select any other one-minute long range of content in a video.

According to another embodiment, the thumb 404 could be kept at the midpoint of the range or set at an arbitrary point within the range.

Selecting a Range in Fixed Thumb Mode

Figure 5:
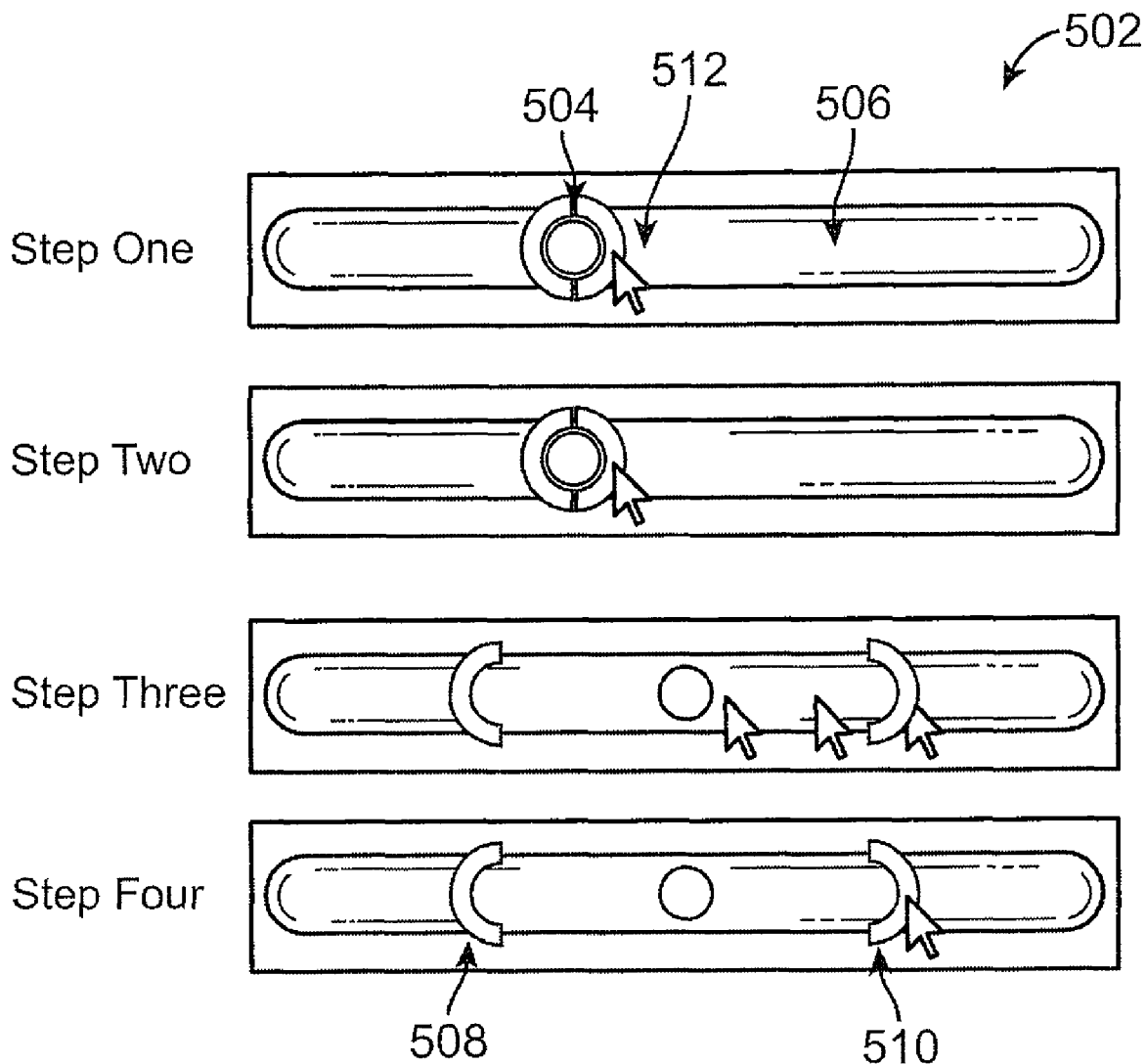
FIG. 5 is a block diagram illustrating an embodiment of the invention.

FIG. 5 illustrates an embodiment of the invention wherein the slider 502 is used to define a range "around" a selection point. The steps are identical to those described and illustrated in FIG. 4 with some differences; therefore, the above passage describing FIG. 4 will not be repeated verbatim, but instead only the differences will be explained.

According to an embodiment, the difference arises from a user's desire to select a full range around the thumb 504, or selection point. FIG. 4 illustrates an embodiment wherein one edge of the range is selected, and upon releasing the selected edge, the full range comprising both edges is selected and displayed. Therefore, one edge of the desired range is defined first and the other edge is defined afterwards in response. Some users may prefer a behavior where both edges of the range are defined at the same time, which is what this embodiment enables. This mode or behavior switching may be accomplished in a number of ways. According to one embodiment, a modifier key is pressed on a keyboard which signals that the mode has changed from the default behavior.

Referring to FIG. 5, in step one, the user positions a pointer 512, manipulated by a mouse or similar input device, over either edge of the control. In the illustrated embodiment, the pointer 512 is positioned over the right edge 510 of the control. In step two, prior to selecting the right edge 510 of the control by clicking a mouse button or providing similar input, the user may switch the selection mode from fixed-edge mode to fixed-thumb mode, and vice versa according to a particular embodiment. For example, in step two, the user may press a modifier key or provide similar input prior to selecting the right edge 510 of the control. According to one embodiment, visual or other feedback may be given upon clicking on the right edge 510, such as changing the appearance of the right edge 510. In one embodiment, clicking the right edge 510 of the control after pressing a modifier key operates to ready both edges 508, 510 for repositioning and ultimately defining a selected range at the same time.

In step three, the user drags the right edge 510 to the right along the track 506 in order to define the entire selected range. In addition to the right edge 510 moving along the track 506 to indicate the range being selected, the left edge 508 moves along the track 506 to the left in concert with the right edge 510. Therefore, the user is given a visual indication of the size of the entire range to be selected, instead of only one side of the range. According to one embodiment, visual or other feedback may be given while dragging to indicate that a range is being defined, such as highlighting the range or edge.

In step four, the user releases the mouse button or similar input control, which operates to "set" both edges of the range at points equidistant from the thumb. According to one embodiment, visual or other feedback may be given upon releasing the right edge 510, such as blinking the range. Similarly, if the user performs the above operations on the left edge 508, the right edge 510 will move to the right of the thumb 504 an equal distance as moved by the left edge 508. Because this embodiment operates to move both edges at the same time, whether the user first selects the left edge 508 or right edge 510 is of no moment.

According to another embodiment, the thumb 504 could be kept at the midpoint of the range or set at an arbitrary point within the range.

Using the Slider Widget to Browse Objects

Figure 6:
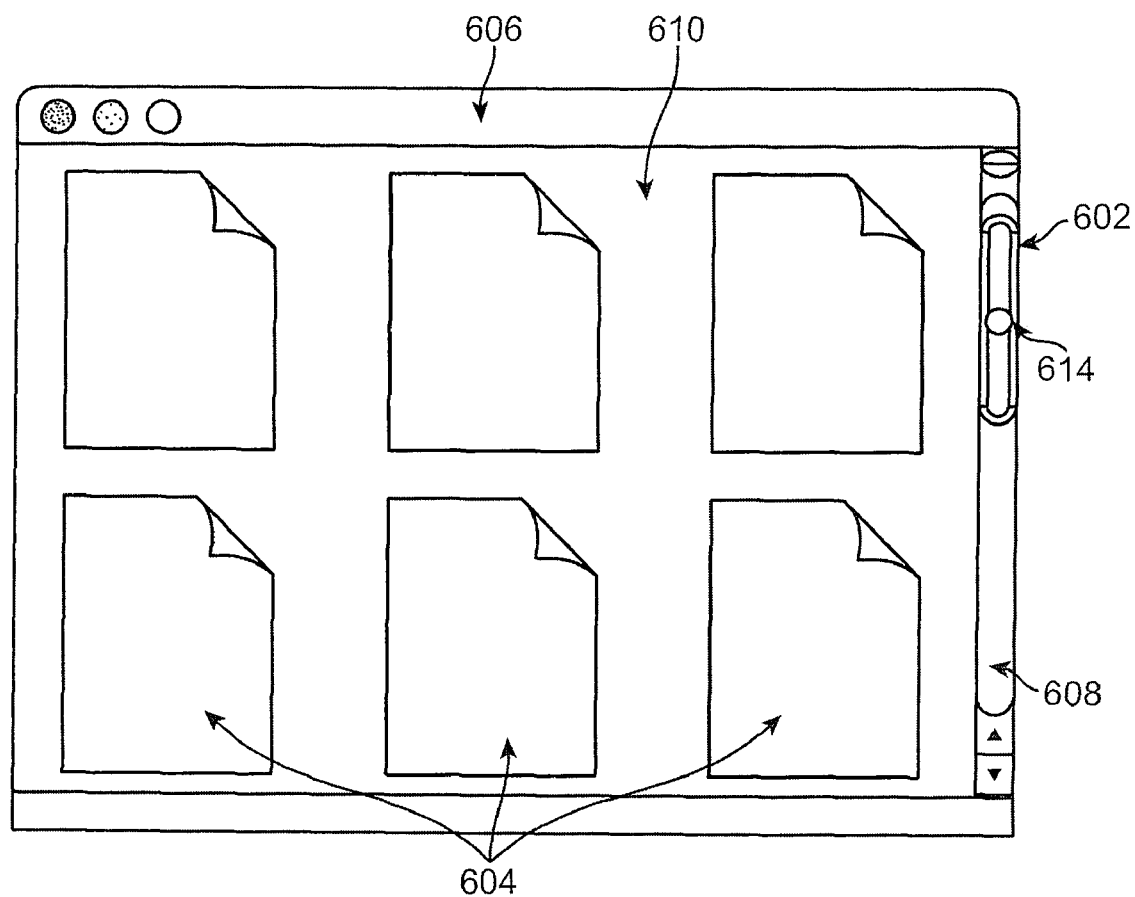
FIG. 6 is a block diagram illustrating an embodiment of the invention.

According to one embodiment of the invention, the above techniques may be used to control how much of a large document may be viewed at one time, as well as how many files or objects to view at any one time, for example, within a folder. FIG. 6 illustrates one embodiment of the invention wherein the slider 602 is utilized in the context of browsing multiple objects 604 within, for example, a window 606. By using the slider as the thumb of a scrollbar 608, a user may choose to view not just one page 610 at a time, but any number of pages at a time by selecting a range of n pages.

According to this embodiment, the slider 602 is used within a scrollbar GUI element 608. Instead of a basic thumb being moved along the scrollbar track 608 to view however many objects are present on each page, a user may use the above techniques to first define how many objects 604 appear on each page 610, and then move the thumb 614 to scroll through the objects one page 610 at a time, the number of objects 604 appearing on each page 610 having been defined by setting a range on the slider 602 as described above.

For example, in a window of x size, the default number of objects 604 appearing on each page 610 may be a set number y. By using the invention as a "thumb" on a scrollbar 608, a user may define the range of objects as being any number instead of the default number y. In the window 606 illustrated in FIG. 6, the default number of objects 604 appearing on the page 610 may be two. By using the above-described techniques to define a range of the slider 602 being used within the scrollbar 608, the number of objects 604 is set at z instead of y. In FIG. 6, z equals six. According to one embodiment, feedback regarding the exact number of objects 604 for the defined range is given, such as dynamically resizing the number of objects 604 currently appearing in the window 606 to specifically show how many objects 604 will be displayed.

Then, a user may select the thumb 614 of the slider object 602 being used within a scrollbar 608 and drag along the track defined by the scrollbar background. This will scroll through z objects at a time instead of y.

Using the Slider Widget as a Box-and-Whisker Plot

Figure 7:
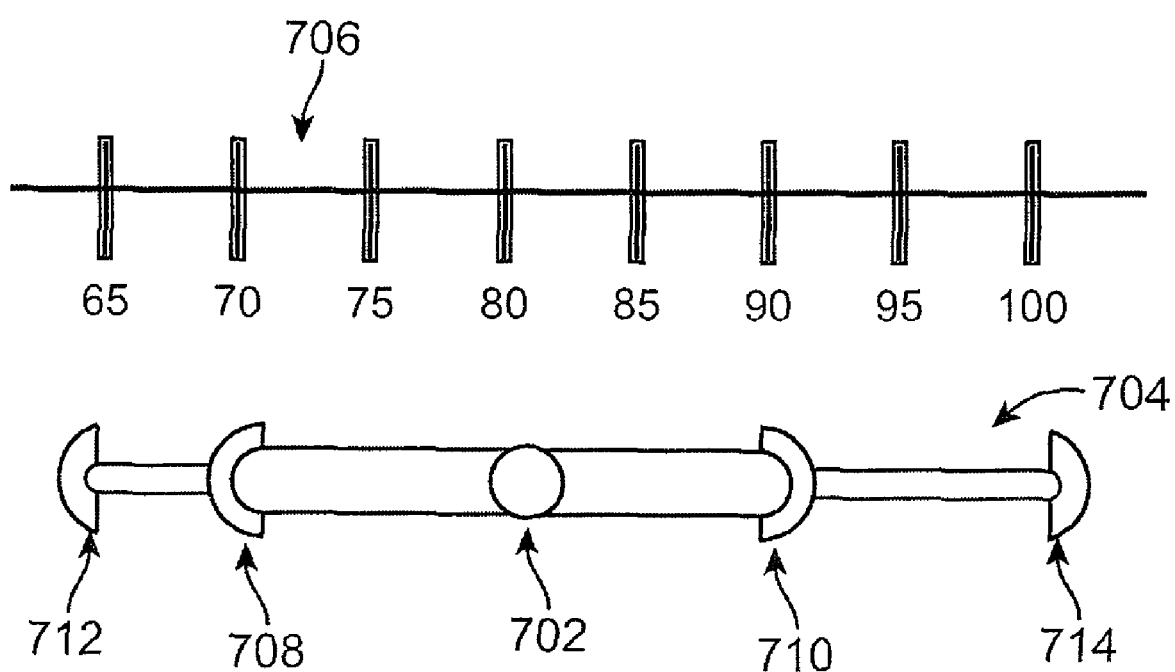
FIG. 7 is a block diagram illustrating an embodiment of the invention.

FIG. 7 illustrates another embodiment of the invention wherein the slider may be used to approximate a "box-and-whisker" plot commonly used in statistical analysis. In this embodiment, the thumb 702 of the slider 704 may be positioned along a numerical scale 706, with the position of the thumb 702 representing the median of a sample. Then, the left edge 708 and the right edge 710 may be positioned as described above to represent, for example, the first and third quartile medians of the sample. According to one embodiment, two outer edges 712, 714 may be added to the slider 704 and positioned as described above to represent, for example, the upper and lower quartile medians of the sample. In other embodiments, the thumb 702 and any number of sets of edges 708-714 may be used to represent different measurements of a sample.

Using the Slider Widget to Define Flexible Amounts

Figure 8:
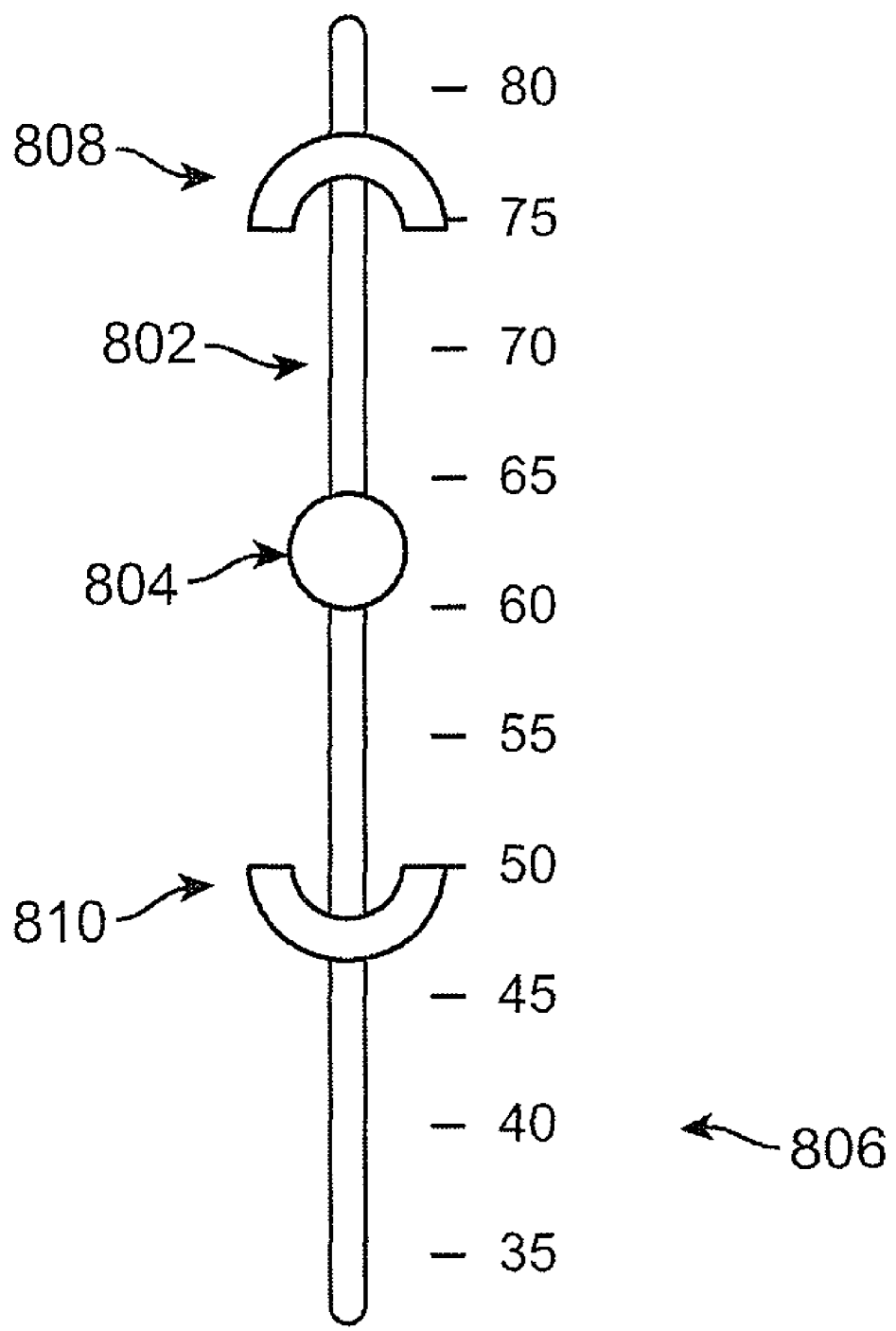
FIG. 8 is a block diagram illustrating an embodiment of the invention.

FIG. 8 illustrates another embodiment of the invention wherein the slider may be used to define amounts such that a flexible dimension is added to a selection of current amounts. For example, one embodiment envisions using the slider invention to define behaviors in investment management. If a user desired to set an automatic buy or sell price for a certain stock, the slider 802 could be used to define a "range of ownership criteria." The thumb 804 of the slider could be positioned along a scale of stock prices 806 at the exact point the user wished to buy or sell the stock. By defining a range as described above, the left edge 808 and right edge 810 may define a range within which to buy or sell the stock. In FIG. 8, the price at which the user wants to buy or sell the stock is set at approximately 62. In one embodiment, visual or other aids are displayed during the positioning of the thumb 804 and edges 808, 810 to give the exact number represented by the elements. By setting the edges 808, 810, a range of prices at which the user agrees to sell or buy the stock is defined. In FIG. 8, the user wishes to sell the stock if the stock price reaches a ceiling of approximately 77, and wishes to buy the stock if the price reaches a floor of approximately 47.

Figure 9:
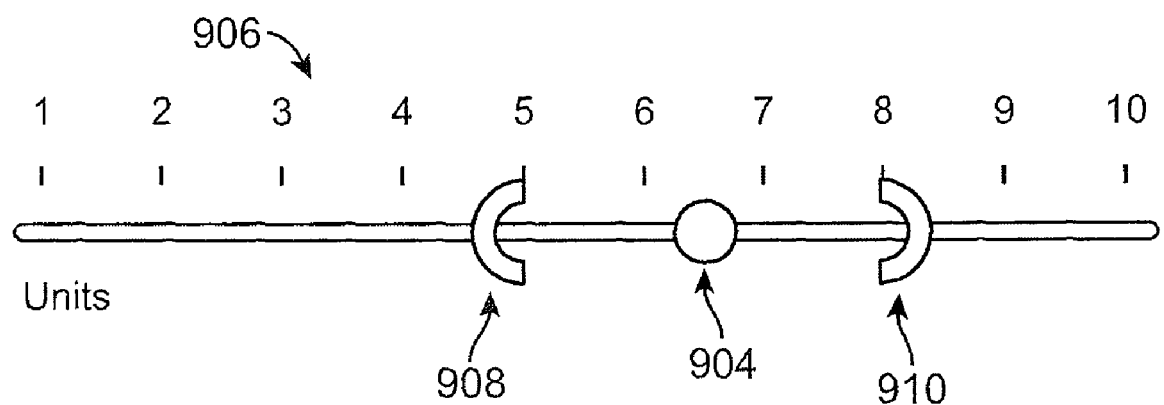
FIG. 9 is a block diagram illustrating an embodiment of the invention.

FIG. 9 illustrates another embodiment of the invention wherein the slider may be used to define amounts such that a flexible dimension is added to a selection of current amounts. In this embodiment, the slider invention may be used to define inventory buffers in order to optimize resource use and insure against unexpected manufacturing delays.

The thumb 904 of the slider could be positioned along a scale of daily unit production 906 at the exact point the user wanted to set daily production. By defining a range as described above, the left edge 908 and right edge 910 may define a range within which the level of production is acceptable and will not result in maintaining too much or too little inventory. In FIG. 9, the number of units of daily production is set at approximately 6.6. In one embodiment, visual or other aids are displayed during the positioning of the thumb 904 and edges 908, 910 to give the exact number represented by the elements. By setting the edges 908, 910, a range of acceptable unit production is defined. In FIG. 9, the user defines the lower bound of acceptable daily production at approximately 4.6, and the upper bound of acceptable daily production at approximately 8.3.

Feedback During Use of the Slider Widget

Another embodiment of the invention utilizes visual or other feedback to assist the user in positioning the slider accurately. One embodiment comprises "tooltips," or small windows appearing alongside the slider which appear during operation to display the exact number or other reference point along the scale at which the slider element is being placed.

Other Uses

The slider widget described herein may be applied to any type application within which a point along a scale may be defined, and where one or multiple ranges within the scale may be defined as well. The preceding descriptions of embodiments of the invention in the context of GUI widgets should not be construed as a limitation on the invention.

Hardware Overview

Figure 10:
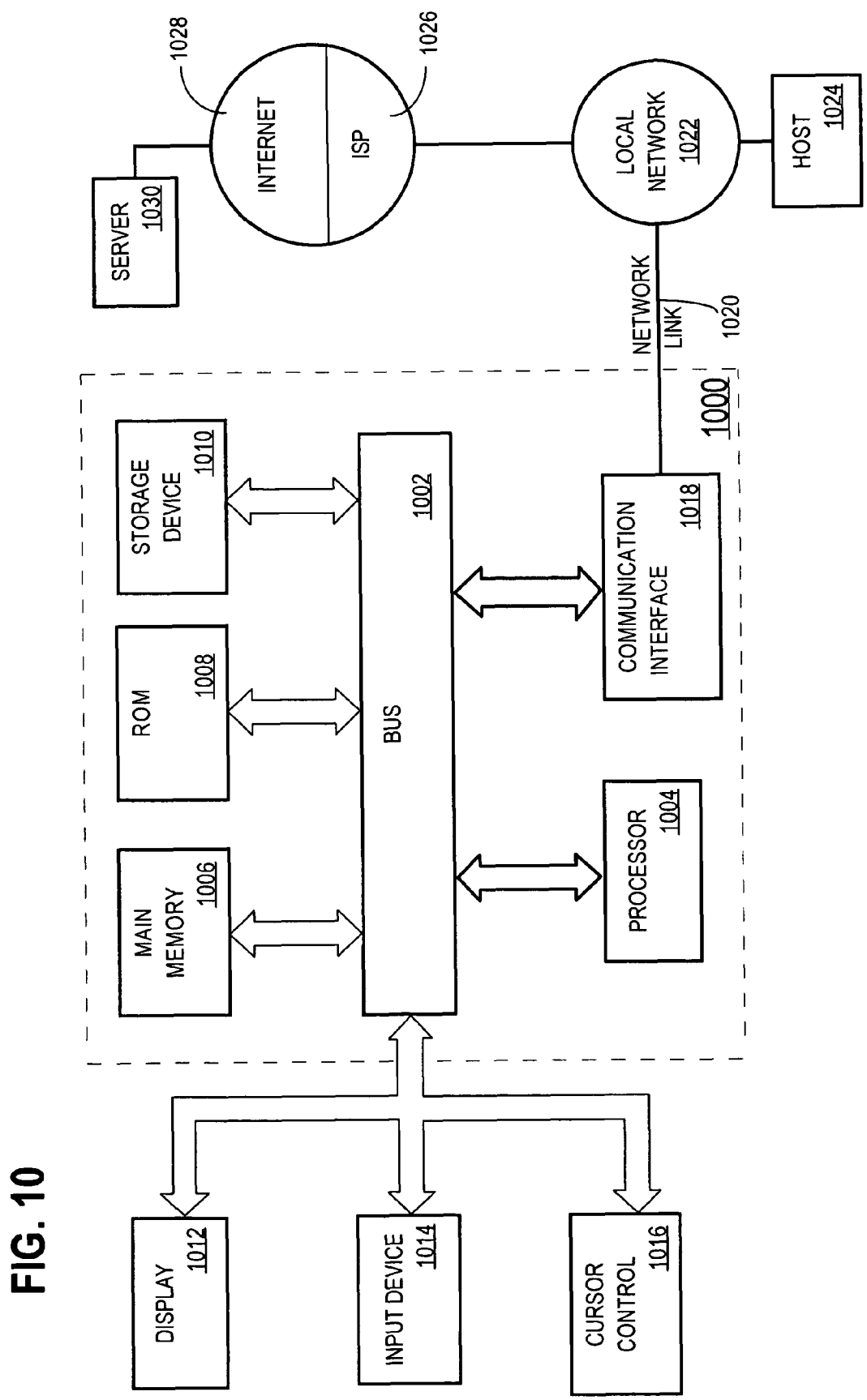
FIG. 10 is a block diagram of a computer system on which embodiments of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for selecting a point or range, the method comprising:

displaying a slider widget that includes a thumb, a first edge element and a second edge element;

wherein the thumb, the first edge element and the second edge element are positioned along a track that corresponds to a first range, the first edge element being positioned along the track at a distance along the track from the thumb, the second edge element being positioned along the track at a distance along the track from the thumb;

wherein the position of the first edge element and the position of the second edge element define a sub-range of said first range;

receiving first user input that moves the thumb along the track;

in response to the first user input that moves the thumb along the track, automatically moving the first edge element and the second edge element along the track in a manner that maintains (a) the distance between the first edge and the thumb and (b) the distance between the second edge and the thumb, and changing the position of the sub-range defined by the first and second edge elements without changing the length of the sub-range;

receiving second user input that moves one of the first or second edge elements along the track while keeping the other edge element stationary; and in response to the second user input, changing the distance between the thumb and the edge element being moved without changing a size of the thumb;

wherein the method is performed by a computing device.

2. The method of claim 1 wherein the first edge element and the second edge element are displayed on opposite sides of said thumb.

3. The method of claim 1 wherein, prior to receiving the first user input, the thumb is positioned at an arbitrary point within the sub-range defined by the positions of first and second edge elements.

4. The method of claim 1, further comprising:
receiving third user input that operates to move the sub-range defined by the positions of the first and second edge elements to another location on said first range.

5. The method of claim 1, further comprising:
receiving third user input directed to said slider widget that selects the endpoints of a second range, wherein said second range comprises a subset of said first range.

6. The method of claim 5, wherein the slider widget comprises an additional set of edge elements operational to define said endpoints of said second range.

7. The method of claim 6, wherein one of said additional set of edge elements defines a starting point of said second range and another one of said additional set of edge elements defines a finishing point of said second range.

8. The method of claim 6, wherein said third user input is directed to one of said additional set of edge elements.

9. The method of claim 6, further comprising:
directing said third user input to a first additional edge element of said additional set of edge elements;
moving said first additional edge element along a path, wherein said path represents said first range;
placing said first additional edge element along said path to define a first endpoint of said endpoints of said second range; and
causing a second additional edge element of said additional set of edge elements to define a second endpoint of said endpoints of said second range after placing said first additional edge element along said path, wherein said first and second additional edge elements fully define said second range.

10. The method of claim 9, wherein said second endpoint lies along the opposite side of said path as said first endpoint and said endpoints are equidistant from said thumb.

11. The method of claim 6, further comprising:
directing said third user input to one of said additional set of edge elements;
moving a first additional edge element of said additional set of edge elements along a path, wherein said path represents said first range;
during said moving of said first additional edge element, causing a second additional edge element of said additional set of edge elements positioned adjacent to the side of said thumb opposite said first additional edge element to move in concert with said first additional edge element, said movement of said second additional edge element being of the same magnitude and in the opposite direction along said path as the movement of said first additional edge element; and placing said first and second additional edge elements along said path to define both of said endpoints of said second range.

12. The method of claim 5, wherein said second range is collapsed in response to receiving user input.

13. The method of claim 1, further comprising providing feedback to a user to assist in positioning said slider widget.

14. The method of claim 13, wherein said feedback comprises tooltips.

15. The method of claim 1, further comprising:
while moving one of the first and second edge elements, maintaining equal distance between the thumb and the first and second edge elements.

16. The method of claim 1, further comprising:
while moving one of the first and second edge elements, maintaining the thumb in a stationary position until the user releases a key.

17. The method of claim 1, wherein the slider widget operates within a scrollbar of a windowed user environment in which a particular window contains multiple objects, the method further comprising:
using the first and second edge elements, setting a range of objects within the window to be viewed; and
using the thumb, selecting a specific one of the objects.

18. A non-transitory computer-readable medium storing computer-executable instructions for:
displaying a slider widget that includes a thumb, a first edge element and a second edge element;
wherein the thumb, the first edge element and the second edge element are positioned along a track that corresponds to a first range, the first edge element being positioned along the track at a distance along the track from the thumb, the second edge element being positioned along the track at a distance along the track from the thumb;
wherein the position of the first edge element and the position of the second edge element define a sub-range of said first range;
receiving first user input that moves the thumb along the track;
in response to the first user input that moves the thumb along the track,
automatically moving the first edge element and the second edge element along the track in a manner that maintains (a) the distance between the first edge and the thumb and (b) the distance between the second edge and the thumb, and
changing the position of the sub-range defined by the first and second edge elements without changing the length of the sub-range;
receiving second user input that moves one of the first or second edge elements along the track while keeping the other edge element stationary; and
in response to the second user input, changing the distance between the thumb and the edge element being moved without changing a size of the thumb.

19. The non-transitory computer-readable medium of claim 18 wherein the first edge element and the second edge element are displayed on opposite sides of said thumb.

20. The non-transitory computer-readable medium of claim 18 wherein, prior to receiving the first user input, the thumb is positioned at an arbitrary point within the sub-range defined by the positions of first and second edge elements.

21. The non-transitory computer-readable medium of claim 18, further comprising instructions for:

receiving third user input that operates to move the subrange defined by the positions of the first and second edge elements to another location on said first range.

22. The non-transitory computer-readable medium of claim 18, further comprising instructions for:
receiving third user input directed to said slider widget that selects the endpoints of a second range, wherein said second range comprises a subset of said first range.

23. The non-transitory computer-readable medium of claim 22, wherein the slider widget comprises an additional set of edge elements operational to define said endpoints of said second range.

24. The non-transitory computer-readable medium of claim 23, wherein one of said additional set of edge elements defines a starting point of said second range and another one of said additional set of edge elements defines a finishing point of said second range.

25. The non-transitory computer-readable medium of claim 23, wherein said third user input is directed to one of said additional set of edge elements.

26. The non-transitory computer-readable medium of claim 23, further comprising instructions for:
directing said third user input to a first additional edge element of said additional set of edge elements;
moving said first additional edge element along a path, wherein said path represents said first range;
placing said first additional edge element along said path to define a first endpoint of said endpoints of said second range; and
causing a second additional edge element of said additional set of edge elements to define a second endpoint of said endpoints of said second range after placing said first additional edge element along said path, wherein said first and second additional edge elements fully define said second range.

27. The non-transitory computer-readable medium of claim 26, wherein said second endpoint lies along the opposite side of said path as said first endpoint and said endpoints are equidistant from said thumb.

28. The non-transitory computer-readable medium of claim 23, further comprising instructions for:
directing said third user input to one of said additional set of edge elements;
moving a first additional edge element of said additional set of edge elements along a path, wherein said path represents said first range;
during said moving of said first additional edge element, causing a second additional edge element of said additional set of edge elements positioned adjacent to the side of said thumb opposite said first additional edge element to move in concert with said first additional edge element, said movement of said second additional edge element being of the same magnitude and in the opposite direction along said path as the movement of said first additional edge element; and
placing said first and second additional edge elements along said path to define both of said endpoints of said second range.

29. The non-transitory computer-readable medium of claim 22, wherein said second range is collapsed in response to receiving user input.

30. The non-transitory computer-readable medium of claim 18, further comprising instructions for providing feedback to a user to assist in positioning said slider widget.

31. The non-transitory computer-readable medium of claim 13, wherein said feedback comprises tooltips.

32. The non-transitory computer-readable medium of claim 18, further comprising:
while moving one of the first and second edge elements, maintaining equal distance between the thumb and the first and second edge elements.

33. The non-transitory computer-readable medium of claim 18, further comprising instructions for:
while moving one of the first and second edge elements, maintaining the thumb in a stationary position until the user releases a key.

34. The non-transitory computer-readable medium of claim 18, wherein the slider widget operates within a scrollbar of a windowed user environment in which a particular window contains multiple objects, the computer-readable storage medium further comprising instructions for:
using the first and second edge elements, setting a range of objects within the window to be viewed; and
using the thumb, selecting a specific one of the objects.

* * * * *